US011458874B2

(12) United States Patent
Nagai et al.

(10) Patent No.: US 11,458,874 B2
(45) Date of Patent: Oct. 4, 2022

(54) VEHICLE SEAT

(71) Applicant: Toyota Jidosha Kabushiki Kaisha, Toyota Aichi-ken (JP)

(72) Inventors: Tetsuya Nagai, Okazaki (JP); Takashi Sugimoto, Anjyo (JP); Osamu Oda, Toyota (JP); Kohshi Katoh, Toyota (JP); Akira Takinami, Toyota (JP); Masatoshi Hada, Nagakute (JP)

(73) Assignee: TOYOTA JIDOSHA KABUSHIKI KAISHA, Toyota (JP)

( * ) Notice: Subject to any disclaimer, the term of this patent is extended or adjusted under 35 U.S.C. 154(b) by 485 days.

(21) Appl. No.: 16/596,887

(22) Filed: Oct. 9, 2019

(65) Prior Publication Data
US 2020/0114795 A1 Apr. 16, 2020

(30) Foreign Application Priority Data
Oct. 11, 2018 (JP) .............................. JP2018-192402

(51) Int. Cl.
*B60N 2/39* (2006.01)
*B60N 2/90* (2018.01)
*B60N 2/10* (2006.01)
*B60N 2/02* (2006.01)

(52) U.S. Cl.
CPC .............. *B60N 2/919* (2018.02); *B60N 2/10* (2013.01); *B60N 2/39* (2013.01); *B60N 2/0244* (2013.01); *B60N 2002/0208* (2013.01); *B60N 2002/952* (2018.02)

(58) Field of Classification Search
CPC .................................. B60N 2/919; B60N 2/39
See application file for complete search history.

(56) References Cited

U.S. PATENT DOCUMENTS

| | | | |
|---|---|---|---|
| 2003/0023363 A1* | 1/2003 | Katz | B60N 2/0244 701/49 |
| 2007/0255469 A1* | 11/2007 | Uenuma | B60N 2/0244 701/1 |
| 2008/0133092 A1* | 6/2008 | Hozumi | B60N 2/986 701/49 |
| 2014/0191550 A1* | 7/2014 | Katoh | B60N 2/64 297/344.1 |
| 2015/0306982 A1 | 10/2015 | Hamabe et al. | |

(Continued)

FOREIGN PATENT DOCUMENTS

| | | | | |
|---|---|---|---|---|
| DE | 102017208601 A1 * | 11/2018 | | |
| DE | 102018108488 B4 * | 1/2022 | ........... | B60N 2/0248 |

(Continued)

*Primary Examiner* — Timothy J Brindley
(74) *Attorney, Agent, or Firm* — Dinsmore & Shohl LLP (57) ABSTRACT

A vehicle seat includes a lock-to-neutral-position mechanism that locks a seat cushion at a neutral position, and an immediate lock mechanism that locks the seat cushion immediately at a current position when locking is required. A steering sensor senses a steering angle and a steering angular velocity. The immediate lock mechanism performs the locking when the steering angle is large, whereas the lock-to-neutral-position mechanism performs the locking when the steering velocity is high. When the steering wheel is at the neutral position, the locking by the immediate lock mechanism is released and the locking is switched over to the lock-to-neutral-position mechanism that is in a lock ready state.

12 Claims, 8 Drawing Sheets

(56) References Cited

U.S. PATENT DOCUMENTS

2018/0022238 A1*  1/2018  Gonzalez Uribe  .. B60N 2/7094
                                                  297/325
2018/0292821 A1* 10/2018  Minato ................ B60N 2/067
2021/0146803 A1*  5/2021  Wu .................... B60W 50/14
2021/0309124 A1* 10/2021  Fields ............... B60W 30/095

FOREIGN PATENT DOCUMENTS

| EP | 3275725 A1 | 1/2018 | |
|----|------------|--------|---|
| JP | 2015-209131 A | 11/2015 | |
| WO | WO-2016181487 A1 * | 11/2016 | ........... B60N 2/0252 |
| WO | WO-2019234014 A1 * | 12/2019 | .............. B60N 2/10 |
| WO | WO-2020085304 A1 * | 4/2020 | ............. B60N 2/763 |

* cited by examiner

VEHICLE SEAT

CROSS REFERENCE TO RELATED APPLICATION

This application claims priority to Japanese Patent Application No. 2018-192402 filed on Oct. 11, 2018, which is incorporated herein by reference in its entirety including the specification, claims, drawings, and abstract.

TECHNICAL FIELD

The present disclosure relates to a vehicle seat, in particular to a seat cushion.

BACKGROUND

A vehicle seat is known in which a seat cushions and a seat back are movable with respect to a vehicle seat frame. For example, JP 2015-209131A discloses a vehicle sheet device (1) in which a seat cushion (seating portion 7) and a seat back (8) are movable with respect to a seat frame (3). The seat cushion (7) is rotatable about a rotation axis (A) that extends through the lumber region of a seated occupant and is tilted such that the front end is lowered. The seat back (8) is rotatable about a rotation axis (B) that extends along a longitudinal axis of the vehicle through the chest of the occupant.

In JP 2015-209131A, the seat cushion (7) includes a gear (18a) with multiple teeth, and the seat frame (3) includes a fixed tooth (19) that can mesh with the teeth of the gear (18a). The seat cushion (7) is locked at a position where the fixed tooth (19) meshes with the gear (18a).

It should be noted that the above reference names and numerals in parentheses are those used in JP 2015-209131A. These reference names and numerals do not relate to any of those used to describe embodiments of the present disclosure.

During driving of a vehicle, it may be desired to promptly lock a seat cushion at a current position. In contrast, it may be desired to lock the seat cushion at a neutral position.

The present disclosure provides a vehicle sheet cushion that is first locked at a current position, and then at neutral position.

SUMMARY

A vehicle seat according to an embodiment of the present application includes a main frame, and a seat cushion that is rotatably supported by the main frame. The vehicle seat also includes a first lock mechanism that locks the seat cushion in accordance with a steering operation and releases the seat cushion when a steering wheel is in vicinity of a neutral position. The vehicle seat further includes a second lock mechanism that enters into a lock ready state to be ready to lock the seat cushion in accordance with a steering operation and locks the seat cushion at the neutral position when the seat cushion is at the neutral position.

In this way, the sheet cushion can be first locked at a current position and then at the neutral position.

The first lock mechanism may lock the seat cushion when a steering angle is larger than or equal to a predetermined value. The second lock mechanism may enter into the lock ready state to be ready to lock the seat cushion when a steering angular velocity is larger than or equal to a predetermined value. In this way, the seat cushion can be locked when the steering angle is large. Even with a small steering angle such as when driving at a high speed, the seat cushion can still be locked as long as the operation speed is high.

The first lock mechanism may be configured not to lock the seat cushion while the seat cushion is locked by the second lock mechanism. In this way, unnecessary locking operations by the first lock mechanism can be avoided.

The first and second lock mechanisms may be allowed to operate when an obstacle in front of the vehicle is detected. In this way, while the seat cushion is not locked during ordinary driving, the seat cushion can be locked when avoiding an obstacle.

The first lock mechanism may include a plate fixed to either one of the main frame and the seat cushion, and a plate clamping mechanism fixed to the other of the main frame and the seat cushion. The plate clamping mechanism may lock the seat cushion by clamping the plate.

The second lock mechanism may include a single retaining element disposed on either one of the main frame and the seat cushion, a receiving element disposed on the other of the main frame and the seat cushion, and a drive element that drives at least one of the retaining element and the receiving element to relatively advance or withdraw the retaining element with respect to the receiving element. The receiving element may include a single recessed receiving area in which the retaining element is received such that the seat cushion is locked at a neutral position when the retaining element is engaged at the bottom of the receiving area. The receiving element may further include two side surfaces that oppose each other in a rotation direction of the seat cushion. The two side surfaces have receiving tilted surfaces that are tilted towards each other to be closer from the opening top to the bottom of the receiving area to thereby guide the retaining element towards the bottom.

BRIEF DESCRIPTION OF DRAWINGS

Embodiment(s) of the present disclosure will be described by reference to the following figures, wherein.

DESCRIPTION OF EMBODIMENTS

A vehicle seat 10 according to an embodiment of the present disclosure is described below by reference to the drawings. In the description below, unless otherwise specified, the terms describing relative positions and orientations such as front, forward, rear, rearward, left, leftward, right, rightward, up, upward, down, and downward respectively refer to positions and orientations from the perspective of an occupant who is sitting in the vehicle seat 10 (hereinafter referred to as a "seated occupant"). In each drawing, the arrows FR, UP, and LH indicate the front, up, and left, respectively.

Figure 1:
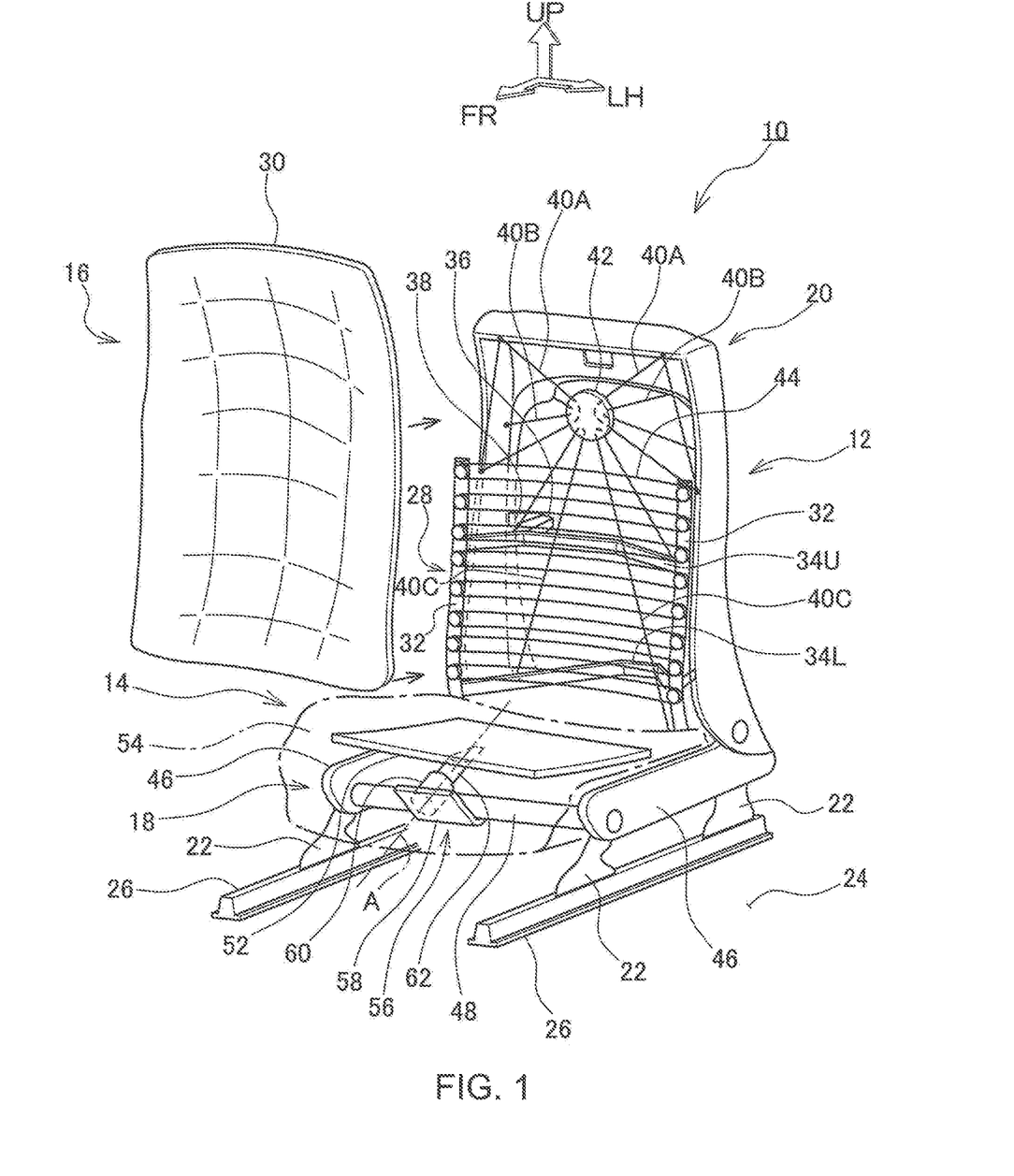
FIG. 1 is an exploded perspective diagram of a vehicle seat according to an embodiment of the present disclosure.
Figure 2:
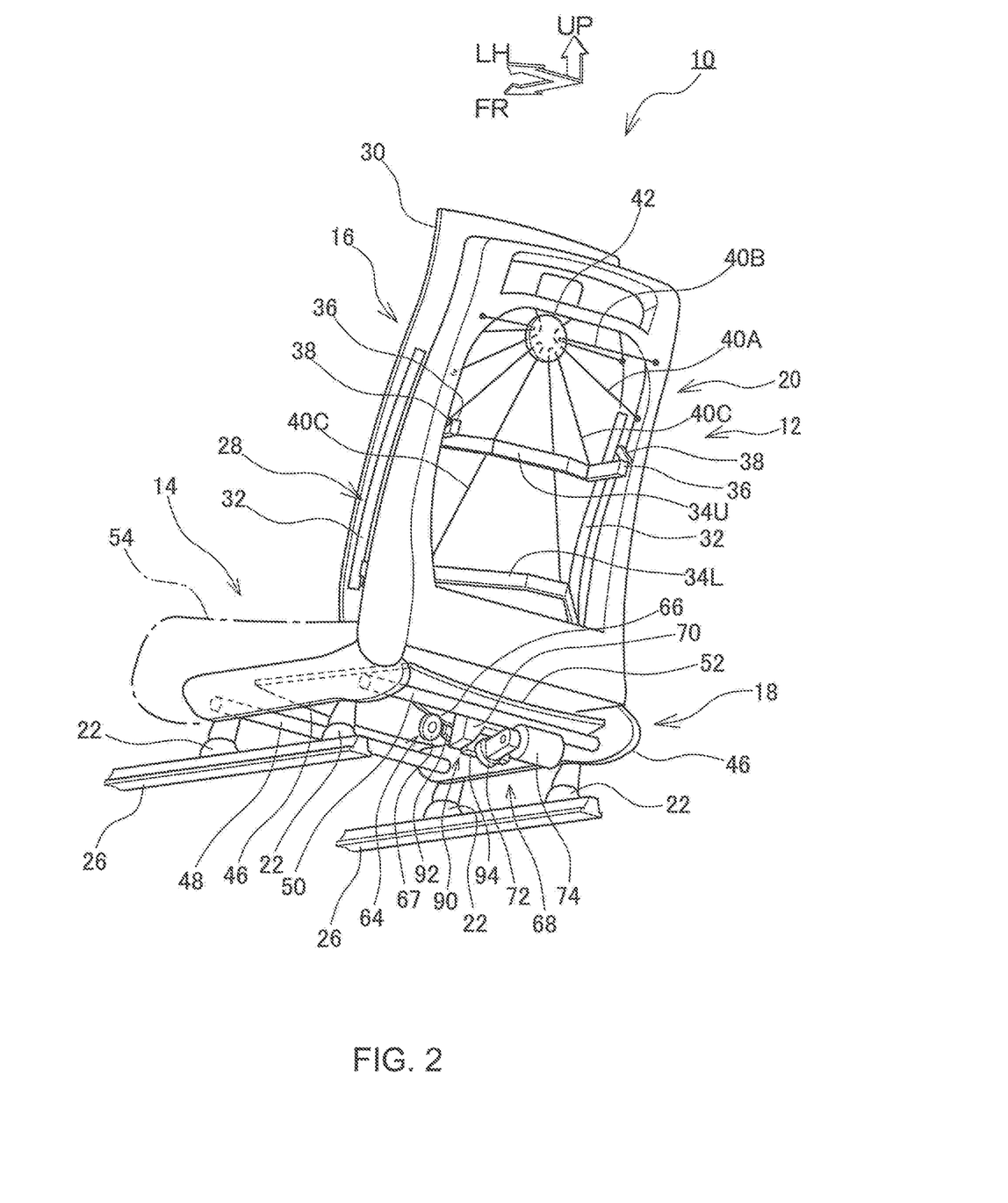
FIG. 2 is a perspective diagram of the vehicle seat according to the embodiment of the present disclosure, viewed from a rear and lower position.

FIGS. 1 and 2 are perspective views schematically showing a simplified structure of the vehicle seat 10. FIG. 1 is a diagram showing the vehicle seat 10 viewed down from a left front position, with some parts disassembled. FIG. 2 is a diagram of the vehicle seat 10 viewed up from a left rear position. The vehicle seat 10 is a seat used for an automobile such as a passenger car. The vehicle seat 10 includes a main frame 12 that is directly mounted on a vehicle body, and a seat cushion 14 and a seat back 16 that are movably supported by the main frame 12. In FIG. 1, the seat cushion 14 is illustrated to allow the internal structure to be viewed through. The seat cushion 14 supports the buttocks and the thighs of a seated occupant from below, while the seat back 16 supports the upper body of the seated occupant from the rear.

The main frame 12 includes a seat cushion frame 18 that supports the seat cushion 14, and a seat back frame 20 that supports the seat back 16. The seat cushion frame 18 includes seat legs 22 respectively at bottom four corners. The seat legs 22 are slidably coupled to a pair of floor rails 26 that are fixed on a vehicle floor 24 and extend along a longitudinal axis of the vehicle. In this way, the vehicle seat 10 is mounted on the floor 24 so that the vehicle seat 10 is slidable along the longitudinal axis of the vehicle. The seat back frame 20 has an inverted U-shape when viewed from the front. The bottom ends of the seat back frame 20 are connected to the rear ends of the seat cushion frame 18. The seat back frame 20 is coupled to the seat cushion frame 18 so that the seat back frame 20 is pivotable about a lateral axis of the vehicle. The tilting angle of the seat back 16 can be adjusted by pivoting the seat back frame 20 with respect to the seat cushion frame 18.

The seat back 16 includes a seat back subframe 28 suspended from the seat back frame 20, and a seat back pad 30 attached to the seat back subframe 28. The seat back subframe 25 includes a pair of vertical members 32 that extend substantially along a vertical axis of the vehicle, respectively on the right and left sides of the vehicle seat 10, and two horizontal members 34U, 34L that extend substantially along the lateral axis to connect the right and left vertical members 32. Of the two horizontal members, the upper horizontal member is referred to as an upper horizontal member 34U, whereas the lower horizontal member is referred to as a lower horizontal member 34L. The upper horizontal member 34U is connected between the two vertical members 32 at a position slightly above the vertical center of the vertical members 32, whereas the lower horizontal member 34L is connected at lower ends of the two vertical members 32. Two spring housing brackets 36 that protrude rearward are fixed at the right and left ends of the upper horizontal member 34U. A rear end of a return spring 38 that is a leaf spring is fixed to a rear end of each of the spring housing brackets 36, while a front end of each of the return spring 38 is fixed to the seat back frame 20. The leaf return springs 38 are disposed so that the thickness direction is along the lateral axis. A deflection of the return springs 38 allows a rightward or leftward movement of the seat back subframe 28 with respect to the seat back frame 20. An elastic force of the return springs 38 returns the seat back subframe 28 to a neutral position that is at the lateral center of the vehicle seat 10.

The seat back subframe 28 is suspended from the seat back frame 20 via multiple wires 40A, 40B, 40C. An intermediate disc 42 is supported by being suspended from the seat back frame 20 with two pairs of suspension wires 40A, 40B, the respective pairs on the right and left, while the seat back subframe 28 is suspended from the intermediate disc 42 with two suspension wires 400, one each on the right and left. The intermediate disc 42 is attached to a rear surface of the seat back pad 30. The seat back 16 swings like a pendulum with the intermediate disc 42 serving as the pivot point. Each of the suspension wires 40A is a seamlessly looped wire passing at two points on the seat back frame 20 and through the intermediate disc 42. Both ends of each of the suspension wires 40B are connected at two points on the seat back frame 20 and a middle portion passes through the intermediate disc 42. One end of each of the suspension wires 40C is connected to the upper horizontal member 34U of the seat back subframe 28, whereas the other end is connected to the lower horizontal member 34L, with a middle portion passing through the intermediate disc 42.

Multiple bridging wires 44 are laterally stretched between the right and left vertical members 32 of the seat back subframe 28. The bridging wires 44 support the seat back pad 30 from behind and receive a load from a seated occupant. The bridging wires 44 are omitted in FIG. 2.

The seat cushion frame 18 includes a pair of longitudinally extending side plates 46, respectively on the right and left of the seat cushion 14, and two bars 48, 50 that connect the side plates 46 on the right and left. Of the two bars 48, 50, the front bar 48 connects the side plates 46 at front end portions of the side plates 46. The rear bar 50 connects the side plates 46 at rear end portions of the side plates 46.

The seat cushion 14 includes a cushion pan 52 movably supported by the seat cushion frame 18, and a cushion pad 54 attached on the cushion pan 52. The cushion pan 52 is supported by the seat cushion frame 18 via a front supporting mechanism 56 and a rear supporting mechanism 64. The front supporting mechanism 56 includes a bracket 58 fixed to the front bar 48, a bearing 60 fixed to the bracket 58, and an axle 62 fixed to the cushion pan 52. The axle 62 is rotatably supported by the bearing 60 so that the cushion pan 52 is rotatable about an axis A of the axle 62. The axis A is tilted so that the axis A extends through the lumber region of a seated occupant and the front end is lowered. The rear supporting mechanism 64 includes a guide rail 66 fixed to the cushion pan 52, and two rollers 67 fixed to the seat cushion frame 18. The drawings only show main parts of the rear supporting mechanism 64, while minor parts are omitted, such as an element to support the rollers 67. The guide rail 66 has a guide surface that has an arch-shape curved about the axis A. The two rollers 67 are in contact with the guide surface of the guide rail 66. By being supported by the front supporting mechanism 56 and the rear supporting mechanism 64, the cushion pan 52 rotates about the axis A. The axis A is also referred to as a rotation axis A.

The vehicle seat 10 further includes two lock mechanisms 68, 90 to lock the seat cushion 14. The lock mechanism 68 is a mechanism to lock the seat cushion 14 at the neutral position in which the seat cushion 14 is not laterally tilted (in other words, the seat cushion 14 is horizontally oriented). The lock mechanism 68 is hereinafter referred to as a lock-to-neutral-position mechanism 68. The lock mechanism 90 can immediately lock the seat cushion 14 at any position. The lock mechanism 90 is hereinafter referred to as an immediate lock mechanism 90. FIG. 2 only shows main elements of the lock-to-neutral-position mechanism 68 and the immediate lock mechanism 90.

The lock-to-neutral-position mechanism 68 includes a retaining block 70 fixed on the cushion pan 52, a retaining pin 72 that is disposed on the seat cushion frame 18 and engageable to the retaining block 70, and a rotary solenoid actuator 74 (hereinafter referred to as a rotary actuator 74) that drives the retaining pin 72. The retaining block 70 includes a single receiving area 76 (refer to FIG. 4) that has a V-groove shape. The retaining pin 72 is advanced to or withdrawn from the receiving area 76 by the rotary actuator 74. When the retaining pin 72 advances to be engaged at a bottom portion of the receiving area 76, the seat cushion 14 is locked at a position that is set according to the position of the receiving area 76. In the vehicle seat 10 according to the present embodiment, the seat cushion 14 is locked at a neutral position; that is, in a horizontal orientation. The retaining block 70 serves as a receiving element that includes the receiving area 76 in which the retaining pin 72 serving as a retaining element is received. Alternatively, the retaining block 70 may be disposed on the seat cushion frame 18, whereas the retaining pin 72 and the rotary actuator 74 may be disposed on the cushion pan. In another configuration, the retaining pin 72 may be fixed and the retaining block 70 may be advanced to or withdrawn from the retaining pin 72. The structure of the lock-to-neutral-position mechanism 68 is described in detail further below.

The immediate lock mechanism 90 includes a brake plate 92 that is fixed on the cushion pan 52, and a plate clamping mechanism 94 that is disposed on the seat cushion frame 18 and secures the cushion pan 52 by clamping the brake plate 92. Alternatively, the brake plate 92 may be disposed on the seat cushion frame 18, and the plate clamping mechanism 94 may be disposed on the cushion pan 52. The structure of the immediate lock mechanism 90 is described in detail further below.

Figure 3:
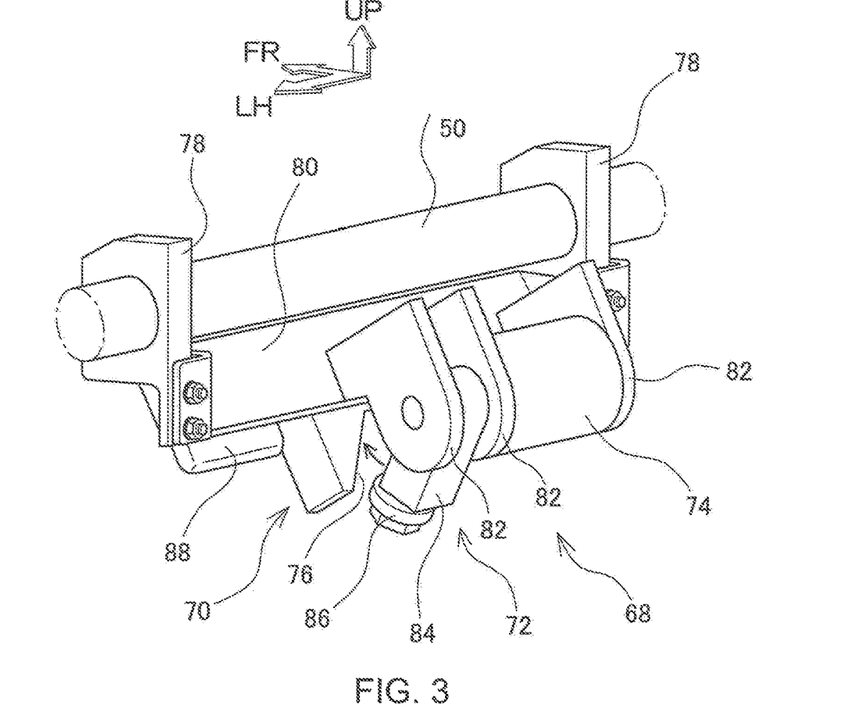
FIG. 3 is a perspective diagram showing details of a lock-to-neutral-position mechanism.
Figure 4:
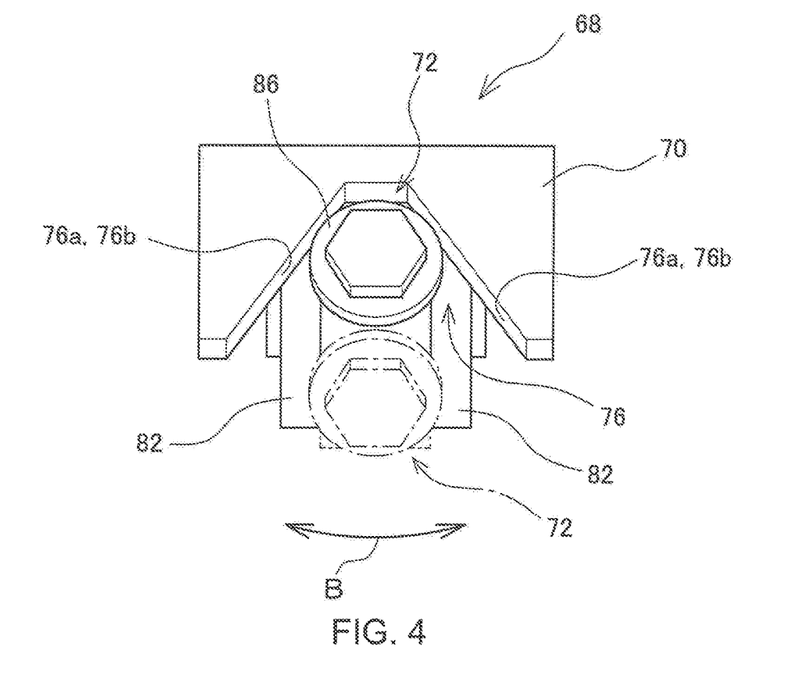
FIG. 4 is a diagram of the lock-to-neutral-position mechanism viewed from the front.

FIG. 3 is a perspective view showing the structure of the lock-to-neutral-position mechanism 68 in further detail. FIG. 3 omits the immediate lock mechanism 90 that is disposed behind the lock-to-neutral-position mechanism 68, FIG. 4 shows the retaining block 70 and retaining pin 72 viewed slightly upward from the front. A fixed-side supporting plate 80 is fixed to the rear bar 50 of the seat cushion frame 18 via two fixing brackets 78. The fixed-side supporting plate 80 supports the retaining pin 72 and the rotary actuator 74 via three fixing plates 82. Each of the fixing plates 82 is fixed by a bolt from the back side of the fixed-side supporting plate 80. One of the fixing plates 82 is disposed between the rotary actuator 74 and the retaining pin 72, another fixing plate 82 is disposed on the opposite end of the rotary actuator 74, and the remaining fixing plate 82 is disposed on the opposite side of the retaining pin 72. In this way, both the right and left sides of the rotary actuator 74 and the retaining pin 72 are respectively supported by the fixing plates 82. The retaining pin 72 includes a square-column shaped arm 84, and a ring 86 disposed on the distal end of the arm 84. The ring 86 is rotatably attached to the arm 84 so that the ring 86 is rotatable about an axis in parallel to the centerline of the arm 84. The ring 86 may be structured with a ball bearing. The inner race of the ball bearing may be coupled to the end surface of the arm 84 with a bolt or other fasteners. In such a case, an outer race of the ball bearing is rotatable with respect to the arm 84.

The retaining block 70 is fixed to a rotatable-side supporting plate 88 that is fixed on the cushion pan 52. The retaining block 70 includes the V-groove shaped receiving area 76 that is opened downwardly. In the receiving area 76, two side surfaces 76a that form the V shape are opposed each other in the rotation direction B of the seat cushion 14 such that the side surfaces 76a are tilted towards each other to be closer from a top to the bottom of the V shape opening. These tilted surfaces are referred to as receiving tilted surfaces 76b. In the present embodiment, the entire side surfaces 76a are the receiving tilted surfaces 76b.

The retaining pin 72 is driven by the rotary actuator 74 such that the distal end of the retaining pin 72 is advanced to or withdrawn from the receiving area 76 of the retaining block 70. In FIG. 4, the position in dash-dot lines show a withdrawn position, whereas the position in solid lines show an advanced position. In the advanced position, the retaining pin 72 comes into contact with the side surfaces 76a on both sides at the bottom of the receiving area 76 to secure the retaining block 70 at this position in the rotating direction. In this way, the seat cushion 14 is locked. In the vehicle seat 10 according to the present embodiment, the seat cushion 14 is disposed at the neutral position in the horizontal orientation along the lateral axis when the seat cushion 14 is locked by the lock-to-neutral-position mechanism 68.

Figure 5:
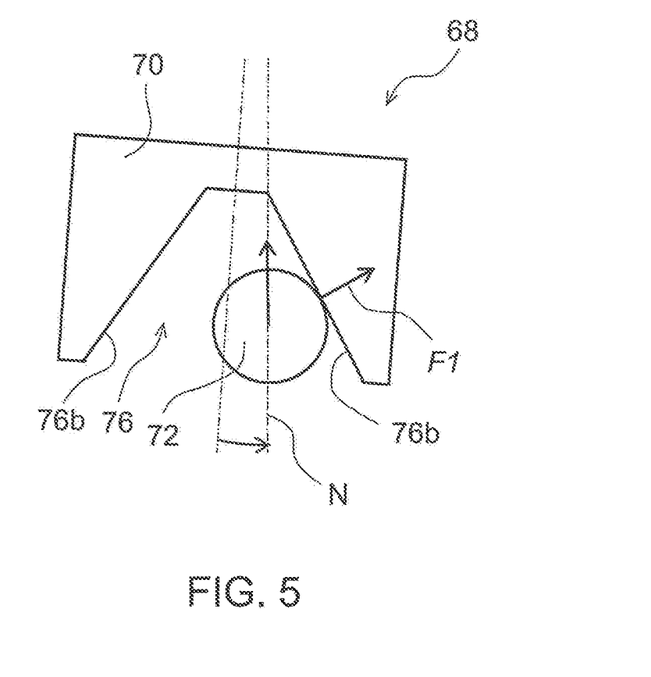
FIG. 5 is a diagram to describe operation of the lock-to-neutral-position mechanism.

FIG. 5 shows an engaging process of the retaining pin 72. The retaining block 70 is deviated from a neutral position N. The opening of the retaining block 70 is designed to have dimensions so that the receiving area 76 can receive the retaining pin 72 regardless of the position of the seat cushion 14. In this way, when the retaining pin 72 is advanced towards the retaining block 70 with the seat cushion 14 deviated from the neutral position, such as at the furthest position in the rotational range, the retaining pin 72 abuts against one of the receiving tilted surfaces 76b. The retaining pin 72 that abuts against the receiving tilted surface 76b applies a force F1 to the retaining block 70. This force F1 and a movement of the seat cushion 14 caused by a movement of the vehicle or a seated occupant move the retaining block 70 to the neutral position as the retaining pin 72 advances. The retaining pin 72 stops when the retaining pin 72 abuts against both of the right and left receiving tilted surfaces 76b. The position of the retaining block 70 at this occasion is the neutral position N. The seat cushion 14 becomes rotatable by withdrawing the retaining pin 72 from the bottom of the receiving area 76.

The ring 86 is rotated while the retaining pin 72 is guided along, the receiving tilted surface 76b. In this way, a friction that would be caused by a movement of the retaining pin 72 is reduced. Further, a flexible material such as rubber may be attached on the receiving tilted surfaces 76b or around the outer circumference of the ring 86. In this way, an impact noise is reduced when the retaining pin 72 impacts on the retaining block 70.

Figure 6:
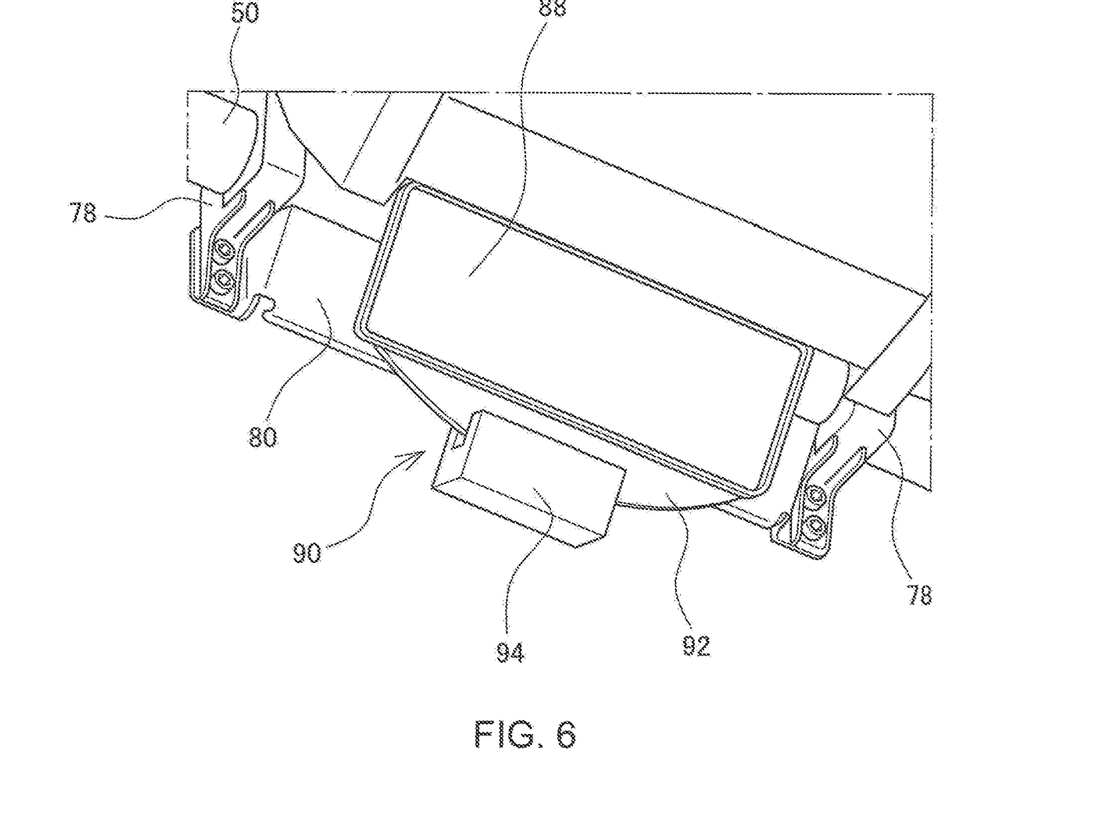
FIG. 6 is a perspective diagram showing details of an immediate lock mechanism.

FIG. 6 is a perspective view of the immediate lock mechanism 90, showing the immediate lock mechanism 90 in FIG. 3 viewed from the opposite side. FIG. 6 omits the lock-to-neutral-position mechanism 68 that is disposed behind the immediate lock mechanism 90. The brake plate 92 is secured to the rotatable-side supporting plate 88 so that the brake plate 92 rotates with the cushion pan 52. The plate clamping mechanism 94 is fixed to the seat cushion frame 18. For example, the plate clamping mechanism 94 may be fixed to a bracket (not shown) that is fixed to the rear bar 50.

Figure 7:
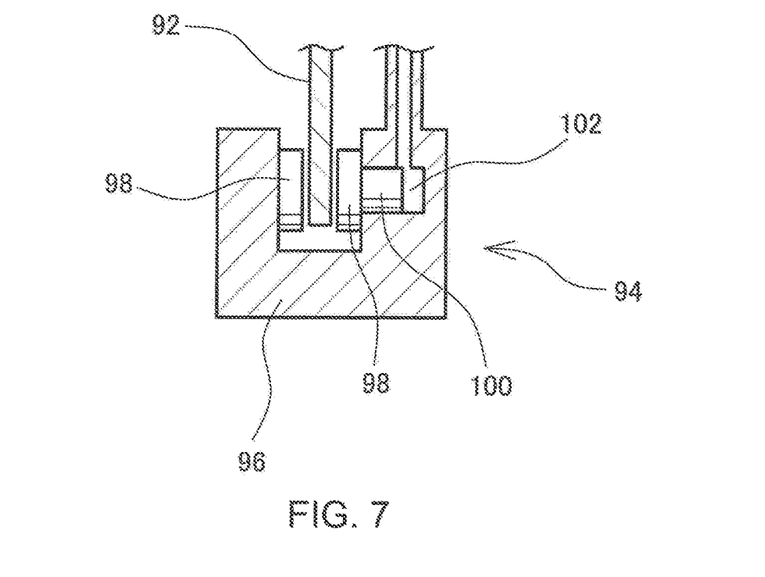
FIG. 7 is a cross-sectional diagram showing a plate clamping mechanism of the immediate lock mechanism.

FIG. 7 is a cross sectional view of the plate clamping mechanism 94. The plate clamping mechanism 94 includes a body 96 that has a U-shaped cross section, and a pair of brake pads 98 that are disposed inside the U-shaped recess to sandwich the brake plate 92. A piston 100 is unitedly provided with one of the brake pads 98. The piston 100 is driven by a hydraulic cylinder 102 to advance or withdraw the brake pad 98 with respect to the brake plate 92. The brake pads 98 clamp the brake plate 92 to stop the movement of the brake plate 92 such that the seat cushion 14 is locked. Because the plate clamping mechanism 94 can clamp the brake plate 92 regardless of the position of the brake plate 92, the seat cushion 14 can be immediately locked when desired at the current position. Other than the hydraulic driving, the brake pad 98 may be mechanically driven using a linkage or other connection.

Figure 8:
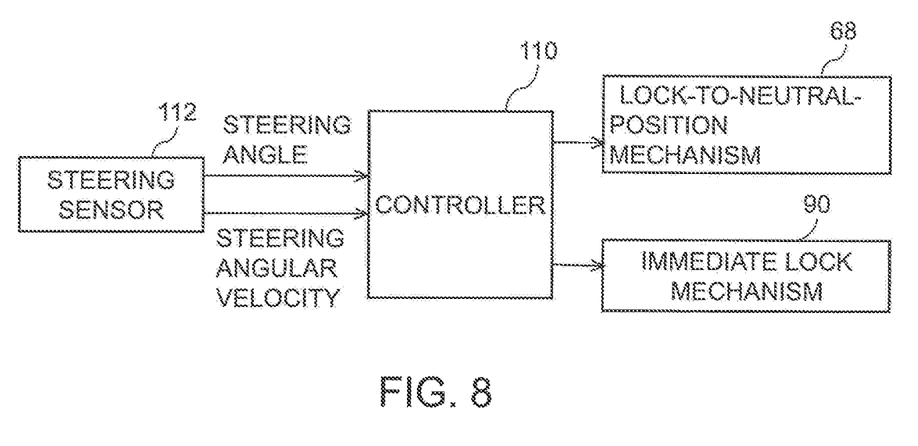
FIG. 8 is a block diagram showing a configuration for a seat cushion lock control.

FIG. 8 is a block diagram showing a configuration for controlling the locking of the seat cushion 14. A controller 110 receives information from a steering sensor 112 and controls the lock-to-neutral-position mechanism 68 and the immediate lock mechanism 90 based on the received information.

The steering sensor 112 senses operation of the steering wheel by an operator of the steering wheel, or a driver (seated occupant), and outputs, to the controller 110, a steering angle that is a rotation angle of the steering wheel from the neutral position (position, when the vehicle runs straight) and a steering angular velocity that is an operation speed. Alternatively, the steering angle alone may be output and the steering angular velocity may be calculated by the controller 110. The controller 110 controls the lock-to-neutral-position mechanism 68 and the immediate lock mechanism 90 based on the obtained information. For the lock-to-neutral-position mechanism 68, advancing and withdrawing of the retaining pin 72 are controlled by drive controlling the rotary actuator 74. For the immediate lock mechanism 90, extending and retracting of the brake pad 98 are controlled by controlling a fluid pressure.

Figure 9:
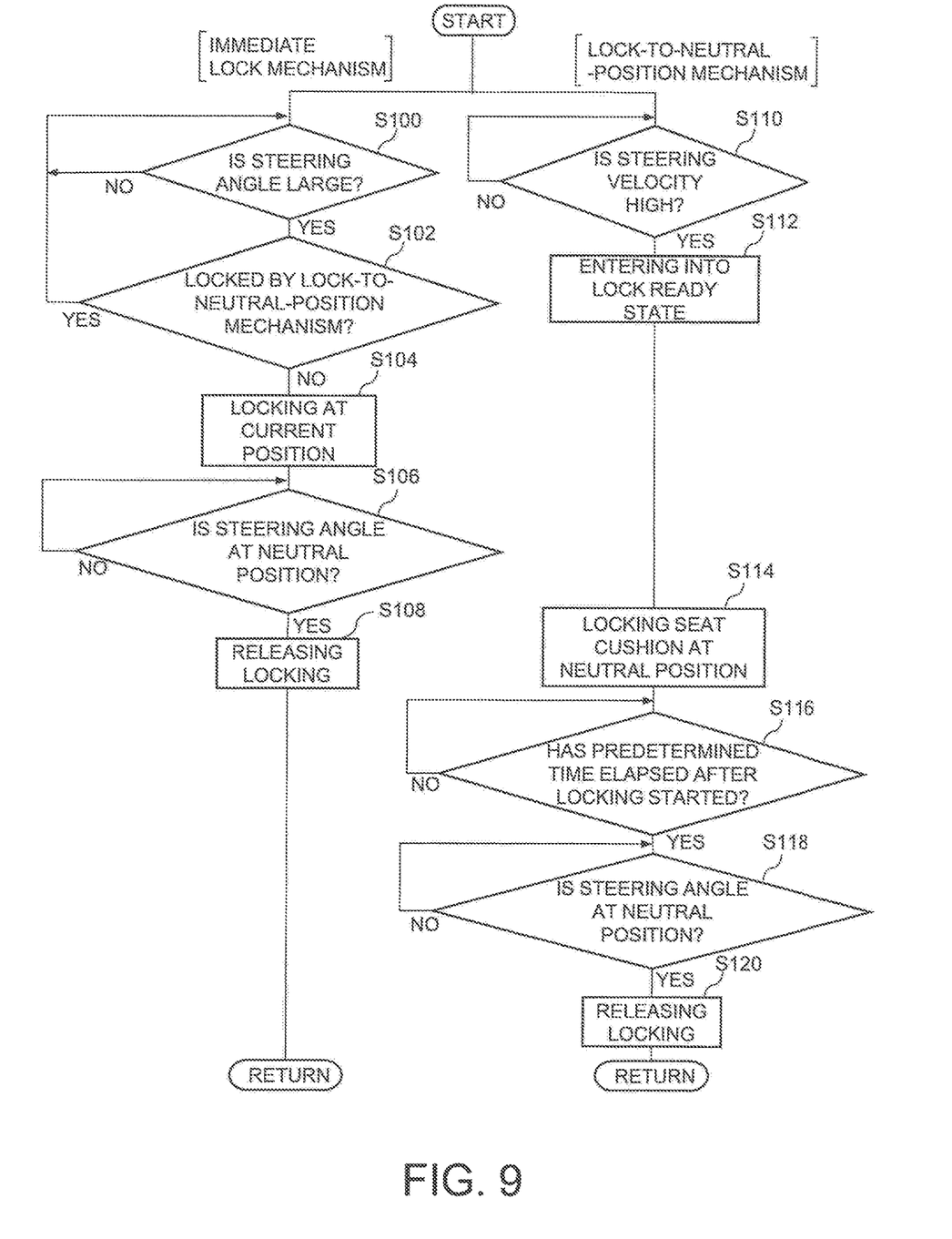
FIG. 9 is a flowchart showing a control flow of the lock-to-neutral-position mechanism and the immediate lock mechanism.

FIG. 9 shows a control flow to lock the seat cushion 14. In controlling the immediate lock mechanism 90, the controller 110 determines whether the steering angle is large (S100). When the driver largely turns the steering wheel such that the steering angle is larger than a predetermined value, the seat cushion 14 is locked to reduce a body movement of the driver in order to minimize the influence of the body movement to the steering operation. When the steering angle is determined to be large in step S100, it is determined next whether the seat cushion 14 is locked by the lock-to-neutral-position mechanism 68 (S102). When the seat cushion 14 is locked by the lock-to-neutral-position mechanism 68, the process returns to step S100 to monitor the steering angle, because further locking by the immediate lock mechanism 90 will be redundant. When the seat cushion 14 is not locked by the lock-to-neutral-position mechanism 68, the seat cushion 14 is locked at the current position by the immediate lock mechanism 90 (S104). The monitoring of the steering angle continues and when the steering wheel is determined to be at the neutral position (S106), the seat cushion 14 is released (S108). The steering angle may be, determined to be at the neutral position when the steering angle is within a certain range from the neutral position.

In controlling the lock-to-neutral-position mechanism 68, the controller 110 determines whether the steering velocity is high (S110). When the driver rapidly turns the steering wheel such that the steering angular velocity is higher than a predetermined angular velocity, the lock-to-neutral-position mechanism 68 enters into a lock ready state to be ready to lock the seat cushion 14 (S112). Specifically, the retaining pin 72 is advanced towards the retaining block 70 until the retaining pin 72 abuts against at least one of the receiving tilted surfaces 76b. Under such conditions, when the seat cushion 14 is moved to be at the neutral position, the retaining pin 72 further advances to the bottom portion of the receiving area 76 of the retaining block 70 to lock the seat cushion 14 at the neutral position (S114). Naturally, when the seat cushion 14 is at the neutral position when the retaining pin 72 is first driven, the seat cushion 14 is immediately locked at the neutral position. Whether the seat cushion 14 is locked at the neutral position can be determined based on the amount of advance of the retaining pin 72, which can be calculated using the rotation angle of the rotary actuator 74. Alternatively, a sensor to sense the position of the seat cushion 14 may be disposed so that the seat cushion 14 is determined to be locked at the neutral position when the retaining pin 72 has been advanced and the sensor senses that the seat cushion 14 is at the neutral position. The information of whether the seat cushion 14 is locked at the neutral position is also used in the above described step S102.

Next, it is determined whether a predetermined time period has been elapsed after the seat cushion 14 is locked (S116). A locking staring time may be set to the locking starting time of the lock-to-neutral-position mechanism 68. Alternatively when the locking is performed by the lock-to-neutral-position mechanism 68 after the locking by the immediate lock mechanism 90, the locking starting time may be set to the locking starting time of the immediate lock mechanism 90. When the predetermined time has elapsed after the locking and the steering angle is at the neutral position (S118), the locking is released (S120).

Locking of the seat cushion 14 during driving is specifically described. When the steering wheel is turned largely or rapidly, reduction in a body movement of the seated occupant may be desired. Such a reduction in the body movement is desired to be performed immediately or when the seat cushion 14 is positioned at the neutral position. In the vehicle seat 10, the seat cushion 14 is immediately locked by the immediate lock mechanism 90 when the reduction of the body movement is desired, and then locked at the neutral position by the lock-to-neutral-position mechanism 68.

When the steering angle is large, the controller 110 instructs the immediate lock mechanism 90 to perform the locking. Because the immediate lock mechanism 90 can immediately lock the seat cushion 14 even when the seat cushion 14 is deviated from the neutral position, immediate locking is possible. The lock-to-neutral-position mechanism 68 performs the locking when the steering velocity is high. When the steering angle is large and the steering velocity is high, the immediate lock mechanism 90 temporarily locks the seat cushion 14, and then the lock-to-neutral-position mechanism 68 locks the seat cushion 14 at the neutral position. The locking by the immediate lock mechanism 90 is released when the steering wheel is returned to the neutral position, and the locking is switched over to the lock-to-neutral-position mechanism 68 that is in the lock ready state. When the steering wheel is returned to the neutral position, the seat cushion 14 is likely to be returned to the neutral position. Accordingly, if the locking by the immediate lock mechanism 90 is released at this occasion, the seat cushion 14 can be expected to return to the neutral position soon after the release of the locking. When the seat cushion 14 is also at the neutral position, the seat cushion 14 is locked by the lock-to-neutral-position mechanism 68 that has been set in the lock ready state.

When the steering angle is small but the steering velocity is high, the lock-to-neutral-position mechanism 68 performs the locking. For example, while the vehicle is driving at a high speed, the steering angle may be relatively small but the steering velocity may be high. While the vehicle is driving at a high speed, the seat cushion 14 can be expected to return to the neutral position relatively soon because the movement of the seat cushion 14 is small and the seat cushion 14 is near the neutral position. Accordingly, the lock-to-neutral-position mechanism 68 may be capable of locking the seat cushion 14 soon.

When the steering angle is large but the steering velocity is low, after the locking is performed by the immediate lock mechanism 90 and released, no locking is performed by the lock-to-neutral-position mechanism 68, such that the seat cushion 14 is left unlocked. For example, when the vehicle turns at an intersection, the steering angle is large, but the steering velocity is not high. Under such conditions, the seat cushion 14 is temporarily locked but released soon after passing the intersection.

When the vehicle attempts to avoid emergency, such as when avoiding an obstacle in front of the vehicle, the seat cushion 14 is immediately locked at the current position and then locked at the neutral position. In such an attempt to avoid emergency while driving on a street (not highway), the steering angle is likely to be large and the steering velocity is likely to be high. Accordingly, locking is first performed by the immediate lock mechanism 90 and then by the lock-to-neutral-position mechanism 68. Upon elapse of a period of time sufficient to expect that the emergency has been avoided, the locking is released after waiting for the steering wheel to return to the neutral position. When the driving speed is high, such as during driving on a highway, the steering angle may not be large during an attempt to avoid emergency. Even in such a case, because the steering velocity is high, the lock-to-neutral-position mechanism 68 locks the seat cushion 14.

Figure 10:
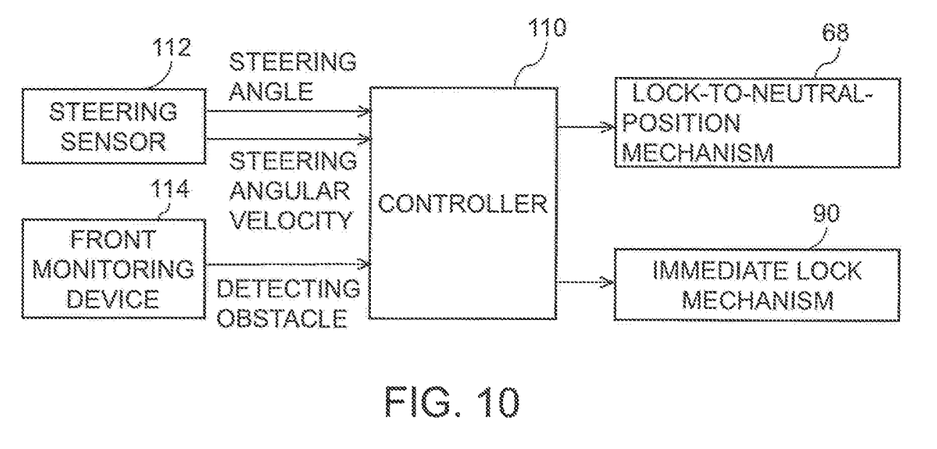
FIG. 10 is a block diagram showing another configuration for the seat cushion lock control.

The locking of the seat cushion 14 described above may be performed when an obstacle in front of the vehicle is detected, FIG. 10 is a block diagram showing a configuration capable of performing a lock control of the seat cushion 14 in response to an obstacle in front of the vehicle. In the configuration shown in FIG. 10, a front monitoring device 114 is added to the configuration shown in FIG. 7. When the front monitoring device 114 detects an obstacle in front of the vehicle, the information is sent to the controller 110. In response to the detection of the front obstacle, the controller 110 performs the control shown in FIG. 9. While not locked during ordinary driving, the seat cushion 14 is locked when an obstacle in front of the vehicle is detected.

The immediate lock mechanism 90 may be configured to lock the seat cushion 14 when the steering angle is large and/or the steering, velocity is high. Further, the lock-to-neutral-position mechanism 68 may be configured to enter into the lock ready state when the steering angle is large and/or the steering velocity is high.

The immediate lock mechanism is not limited to the combination of the brake plate 92 and the plate clamping mechanism 94. The immediate lock mechanism may have a different structure, such as a row of teeth and a claw meshing with the teeth. The row of teeth, that may be arranged along the rotation direction of the seat cushion 14 may be fixed to the seat cushion 14 and the claw may be disposed on the seat cushion frame 18. The seat cushion 14 may be locked by advancing the claw to the row of teeth to mesh the claw with the teeth.

REFERENCE SIGNS LIST 10 vehicle seat, 12 main frame, 14 seat cushion, 16 seat back, 18 seat cushion frame, 20 seat back frame, 46 side plate, 48 front bar, 50 rear bar, 52 cushion pan, 54 cushion pad, 56 front supporting mechanism, 58 bracket, 60 bearing, 62 axle, 64 rear supporting mechanism, 66 guide rail, 67 roller, 68 lock-to-neutral-position mechanism (second lock mechanism), 70 retaining block (receiving element), 72 retaining pin (retaining element), 74 rotary actuator, 76 receiving area, 76a side surface, 76b receiving tilted surface, 78 fixing bracket, 80 fixed-side supporting plate, 82 fixing plate, 84 arm, 86 ring, 88 rotatable-side supporting plate, 90 immediate lock mechanism (first lock mechanism), 92 brake plate, 94 plate clamping mechanism, 96 body, 98 brake pad, 100 piston, 102 hydraulic cylinder, 110 controller, 112 steering sensor, and 114 front monitoring device.

The invention claimed is:

1. A vehicle seat comprising:
   a main frame;
   a seat cushion rotatably supported by the main frame;
   a first lock mechanism locking the seat cushion in accordance with a steering operation and releasing the seat cushion when a steering wheel is in vicinity of a steering wheel neutral position, the first lock mechanism locks the seat cushion when a steering angle is larger than or equal to a first predetermined value; and
   a second lock mechanism positionable into a lock ready state in accordance with a steering operation and locking the seat cushion at a seat cushion neutral position when the seat cushion is at the seat cushion neutral position, the second lock mechanism enters in the lock ready state when a steering angular velocity is larger than or equal to a second predetermined value.

2. The vehicle seat according to claim 1, wherein the first lock mechanism does not lock the seat cushion while the second lock mechanism locks the seat cushion.

3. The vehicle seat according to claim 1, wherein the first lock mechanism and the second lock mechanism are allowed to be operated when an obstacle in front of a vehicle is detected.

4. The vehicle seat according to claim 1, wherein the first lock mechanism comprises
   a plate fixed to either one of the main frame and the seat cushion, and
   a plate clamping mechanism fixed to the other of the main frame and the seat cushion, the plate clamping mechanism locking the seat cushion by clamping the plate.

5. The vehicle seat according to claim 1, wherein the second lock mechanism comprises
   a single retaining element disposed on either one of the main frame and the seat cushion,
   a receiving element disposed on the other of the main frame and the seat cushion, the receiving element comprising
      a single recessed receiving area in which the retaining element is received such that the seat cushion is locked at a neutral position when the retaining element is engaged at a bottom of the receiving area, and
      two side surfaces opposing each other in a rotation direction of the seat cushion, the two side surfaces having receiving tilted surfaces that are tilted towards each other to be closer from a top to the bottom of the receiving area to guide the receiving element towards the bottom, and
   a drive element driving at least one of the retaining element and the receiving element to relatively advance or withdraw the retaining element with respect to the receiving element.

6. A vehicle seat comprising:

a main frame;

a seat cushion rotatably supported by the main frame;

a first lock mechanism locking the seat cushion in accordance with a steering operation and releasing the seat cushion when a steering wheel is in vicinity of a steering wheel neutral position, the first lock mechanism and the second lock mechanism are allowed to be operated when an obstacle in front of a vehicle is detected; and a second lock mechanism positionable into a lock ready state in accordance with a steering operation and locking the seat cushion at a seat cushion neutral position when the seat cushion is at the seat cushion neutral position.

7. The vehicle seat according to claim 6, wherein the first lock mechanism does not lock the seat cushion while the second lock mechanism locks the seat cushion.

8. The vehicle seat according to claim 6, wherein the first lock mechanism and the second lock mechanism are allowed to be operated when an obstacle in front of a vehicle is detected.

9. The vehicle seat according to claim 6, wherein the first lock mechanism comprises a plate fixed to either one of the main frame and the seat cushion, and a plate clamping mechanism fixed to the other of the main frame and the seat cushion, the plate clamping mechanism locking the seat cushion by clamping the plate.

10. A vehicle seat comprising:

a main frame;

a seat cushion rotatably supported by the main frame;

a first lock mechanism locking the seat cushion in accordance with a steering operation and releasing the seat cushion when a steering wheel is in vicinity of a steering wheel neutral position, the first lock mechanism comprises:

a plate fixed to either one of the main frame and the seat cushion, and a plate clamping mechanism fixed to the other of the main frame and the seat cushion, the plate clamping mechanism locking the seat cushion by clamping the plate; and a second lock mechanism positionable into a lock ready state in accordance with a steering operation and locking the seat cushion at a seat cushion neutral position when the seat cushion is at the seat cushion neutral position.

11. The vehicle seat according to claim 10, wherein the first lock mechanism does not lock the seat cushion while the second lock mechanism locks the seat cushion.

12. The vehicle seat according to claim 1, wherein the second lock mechanism comprises a single retaining element disposed on either one of the main frame and the seat cushion, a receiving element disposed on the other of the main frame and the seat cushion, the receiving element comprising a single recessed receiving area in which the retaining element is received such that the seat cushion is locked at a neutral position when the retaining element is engaged at a bottom of the receiving area, and two side surfaces opposing each other in a rotation direction of the seat cushion, the two side surfaces having receiving tilted surfaces that are tilted towards each other to be closer from a top to the bottom of the receiving area to guide the receiving element towards the bottom, and a drive element driving at least one of the retaining element and the receiving element to relatively advance or withdraw the retaining element with respect to the receiving element.

* * * * *